United States Patent [19]

Palmert et al.

[11] Patent Number: 4,958,750
[45] Date of Patent: Sep. 25, 1990

[54] DISPOSABLE FOAM DISPENSING APPARATUS

[75] Inventors: Steven H. Palmert, Brookfield, Wis.; Robert F. Ziems, McLean, Va.

[73] Assignee: Two-Part Foam Propellants, Inc., Cudahy, Wis.

[21] Appl. No.: 439,874

[22] Filed: Nov. 21, 1989

[51] Int. Cl.$^5$ .............................................. B67D 5/52
[52] U.S. Cl. .................................... 222/135; 222/145; 222/402.13; 222/402.14; 239/304; 239/414
[58] Field of Search .......................... 222/135-137, 222/145, 402.13, 402.14; 239/304, 414, 527

[56] References Cited

U.S. PATENT DOCUMENTS

| | | |
|---|---|---|
| 3,303,970 | 2/1967 | Breslau et al. ................. 239/304 X |
| 3,559,890 | 2/1971 | Brooks et al. ...................... 239/304 |
| 3,575,319 | 4/1971 | Safianoff ......................... 222/145 X |
| 3,613,956 | 10/1971 | McCulloch .................... 222/145 X |
| 3,620,414 | 11/1971 | Philipps .......................... 222/145 X |
| 3,635,372 | 1/1972 | Van Dyck et al. ............. 239/304 X |
| 4,496,081 | 1/1985 | Farrey ............................. 222/145 X |
| 4,674,658 | 6/1987 | Van Brocklin .................. 222/145 X |
| 4,773,562 | 9/1988 | Gueret ............................ 222/145 X |
| 4,826,048 | 5/1989 | Skorka et al. .................. 222/145 X |
| 4,880,143 | 11/1989 | Murray et al. ....................... 222/135 |

Primary Examiner—Kevin P. Shaver
Attorney, Agent, or Firm—Robert F. Ziems

[57] ABSTRACT

A disposable foam dispensing kit for retaining a pair of aerosol cans, each containing separate fluid components of a foam system, in a portion relative to a bridge mechanism for simultaneously opening both aerosol can valves. The cans are supported in their operative position by a single carrier having detent formations for enabling snap action assembly of the cans with the carrier. The carrier includes a central post which extends as a tongue on which the bridge member is slidably mounted and ends at a pivot fulcrum to which an actuating cam lever is fitted by snap action.

7 Claims, 2 Drawing Sheets

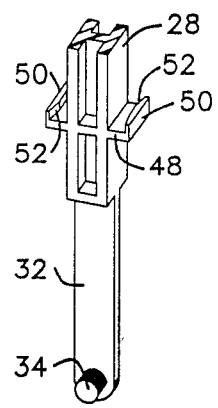
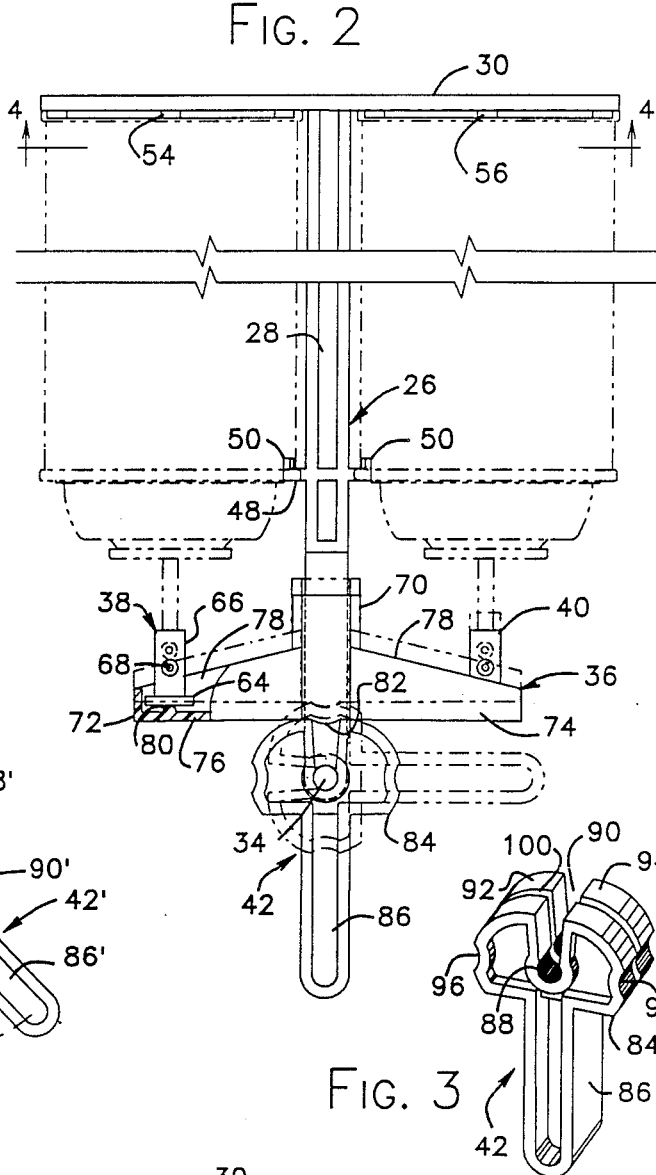
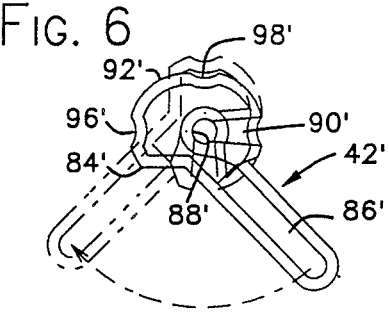
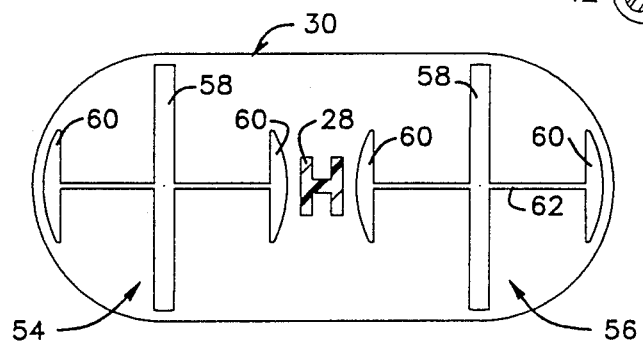

DISPOSABLE FOAM DISPENSING APPARATUS

BACKGROUND OF THE INVENTION

This invention relates to multi-component foam dispensing kits and, more particularly, it concerns a can retention and actuating assembly by which a pair of valve-fitted aerosol cans are supported for packaging and simultaneous discharge of foam components separately contained in the respective cans.

U.S. Pat. Nos. 3,559,890 - Brooks, 3,575,391 -Safianoff, 3,613,956 McCulloch, and 4,496,081-Farrey are representative of prior art related to arrangements for retaining a pair of valve-fitted aerosol cans physically positioned relative to a mechanism for simultaneously opening the respective valves of both cans to pass the foam component contents of the cans to a mixing nozzle for discharge as foam. The disclosures of these patents also represent a specific category within a larger class of disposable urethane foam dispensing kits which have enjoyed a high degree of commercial success for the past several years and which includes kits designed to contain and discharge much larger quantities of foam than the aerosol can kits shown in these patents. Nevertheless, the relatively small aerosol can foam dispensing kit represented by the afore-mentioned patent disclosures is an important adjunct to a product line of disposable urethane foam kits marketed by a single supplier.

With reference again to the disclosures of the above-cited patents, two types of aerosol can kits are represented. For example, the disclosures of the Brooks, Safianoff and McCulloch patents are similar in the sense that the can mounted valves, though simultaneously actuated, are actuated by a trigger mechanism or equivalent by which the cans remain open to dispense the foam components only while they are manually retained in an open condition. The discharge of foam components from the respective aerosol cans is to a dispensing nozzle which may be held in one hand while the other hand retains the cans and the actuating trigger mechanism position to open the can valves. In other words, in all three of these patents only one device is provided for controlling the discharge of foam components from the aerosol cans.

The Farrey patent, on the other hand, includes a mechanism for opening the can mounted valves and a separate metering valve for controlling flow of both foam components from the open can valves to a separately held discharge nozzle. This general arrangement has demonstrated greater appeal in the marketplace than the first-mentioned type of discharge control primarily because it enables the discharge of foam from the nozzle to be metered and more accurately controlled. In other words, the aerosol can valves, by themselves, are capable of actuation only between fully open and fully closed conditions with no potential for an intermediate or metered flow of components through these valves. In addition, the primary focus of attention by one using such aerosol can kits is at the nozzle so that by placing the valve controlling discharge from the nozzle to be operated by the same hand of the operator controlling movement of the nozzle, enhanced operation results.

In the Farrey patent disclosure, the two aerosol cans are retained in side-by-side positional relationship by molded end brackets which snap over opposite ends of the two cans. A pair of nipple fittings are mounted on the can valve stems and are bridged by a T-shaped member. An elongated threaded key is passed through an aperture in an end bracket on one end of the cans and threadably received in the end bracket at the opposite end of the can. As a result of this organization, when it is desired to discharge foam from the cans, the threaded key is first tightened so as to draw the T-shaped member against the nipple fittings and the can mounted valves to move them from a closed to an open position. While the arrangement disclosed in the Farrey patent is effective from the standpoint of attaining simultaneous opening movement of the can valves, the threaded key is tedious to use and becomes an impediment to a quick reclosure of the can mounted valves should such reclosure be necessary in the event of hose or tube breakage between the cans and the mixing nozzle, for example. Perhaps more significantly, the assembly of components required to package the device shown in the Farrey patent is expensive both from the standpoint of the amount of plastic material required to mold the several required parts and also from the standpoint of time required to assemble the cans with the apparatus. Hence, there is need for improvement in the dual control type of aerosol can dispenser kits of the type described.

SUMMARY OF THE INVENTION

In accordance with the present invention, an improved can retention and actuating assembly is provided for a pair of valve-fitted aerosol cans containing separate components to be discharged from the can simultaneously and by which problems in the prior art associated with assembly costs, material costs and impediment to operation during use are substantially alleviated.

The invention is embodied in a combination of components including a one-piece molded carrier in the form of an elongated post to which the pair of aerosol cans containing separate components of the foam system are attached by snap action. The post extends between detente formations adapted to engage opposite ends of the cans and, at the valve ends of the cans, extends as a tongue to a cam fulcrum. The tongue end of the carrier receives a T-shaped bridge component slidably in a manner to engage and actuate the can mounted valves. The assembly of the T-shaped bridge with the tongue portion of the carrier is effected by a cam lever preferably retained on the cam fulcrum by snap action. Caming surfaces on the cam component terminate at opposite ends in detentes to establish a first valve-off orientation and a second valve-open orientation. A pair of nipple fittings are provided between the T-shaped bridge member and the cam valve stems to facilitate the attachment of separate tubing to extend to a nozzle device.

When it is desired to operate the assembled unit, the cam lever is pivoted to move the T bridge against the nipple fittings on both can valve stems to open the can valves for subsequent discharge of the can contained components as foam through the nozzle under the control of a metering device associated with the nozzle.

Among the objects of the present invention are, therefore, the provision of a can retention and actuating assembly for foam containing aerosol cans which is inexpensive, easily and inexpensively assembled and which assures positive and instantaneous action both to open the can valves and to close them if necessary. Other objects and further scope of applicability of the present invention will become apparent from the de-

BRIEF DESCRIPTION OF THE DRAWINGS

FIG. 2 is a fragmented front elevation depicting operation of the invention using solid and phantom lines;

FIG. 3 is an isometric view illustrating the cam lever component of the present invention;

FIG. 4 is a section on line 4—4 of FIG. 2;

FIG. 5 is a fragmentary isometric view illustrating the tongue end portion of the carrier post shown in FIGS. 1 and 2; and FIG. 6 is a front elevation showing an alternative form of cam lever in two positions represented by solid and phantom lines.

DETAILED DESCRIPTION OF THE PREFERRED EMBODIMENTS

Figure 1:
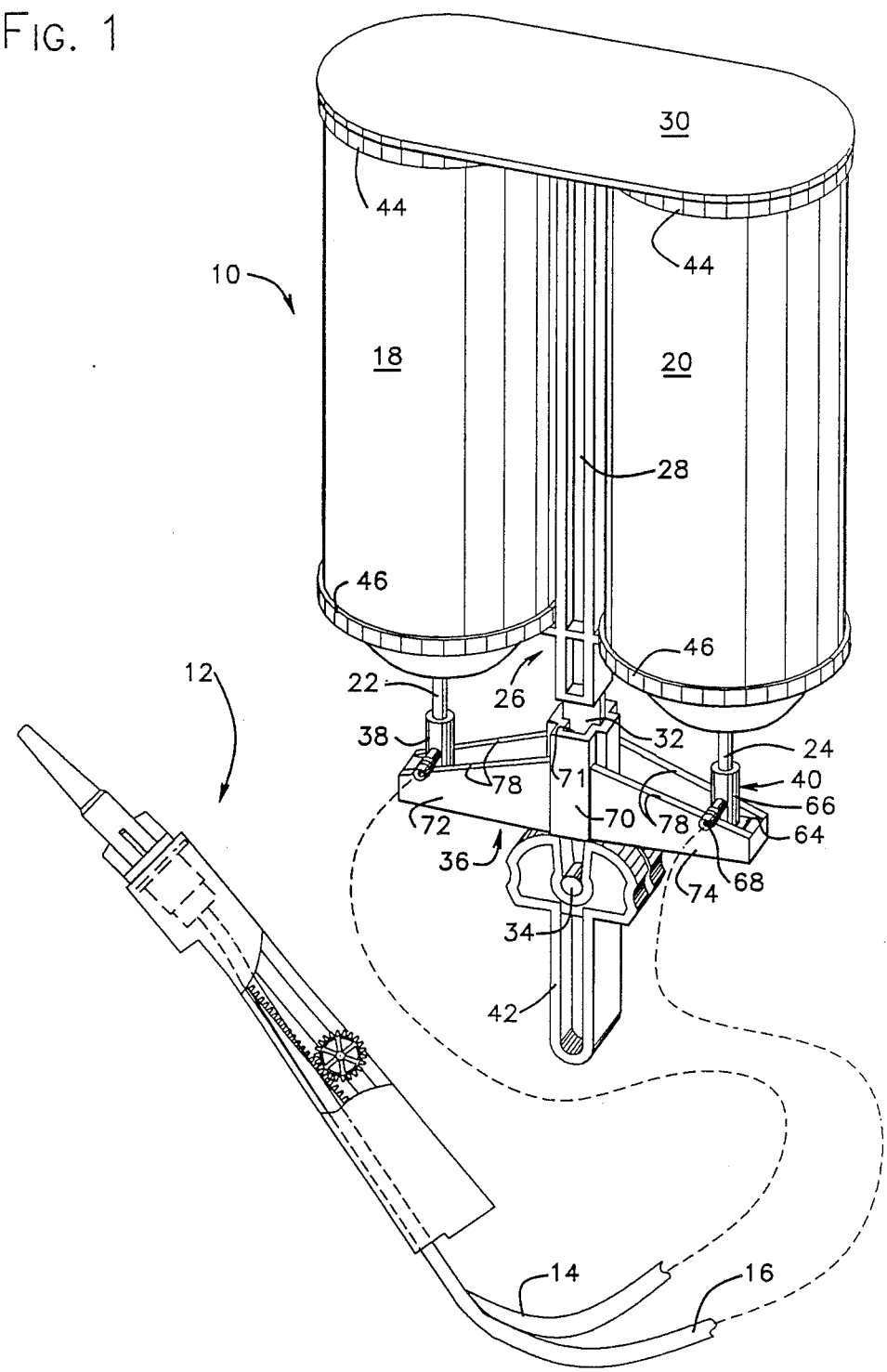
FIG. 1 is an isometric view illustrating the assembled kit incorporating the present invention.

In FIG. 1 of the drawings, an aerosol can assembly is generally designated by the reference number 10 and shown as part of a foam dispensing kit which includes a metering nozzle 12 connected to the assembly 10 by flexible tubular conduits 14 and 16. The assembly 10 includes a pair of aerosol cans 18 and 20, each having a discharge valve which, though not detailed in the drawings, are manifested by tubular stems 22 and 24 projecting from the cans and particularly from the can valves in a well known manner. The can valves are conventional and as such are actuated from a normally closed condition to an open condition by movement of the respective stems 22 and 24 axially toward the cans 18 and 20.

The cans 18 and 20 are retained in parallel spaced relationship as shown in FIG. 1 by a one-piece carrier generally designated by the reference numeral 26 and including an elongated post formation 28. In the orientation shown in FIG. 1, the post 28 extends at its top from the center of a plate-form cap 30 which, in the embodiment shown, is of an oblong configuration to overlie the ends of the cans 18 and 20. The end of the post 28 opposite from the cap 30 extends as a tongue 32 to a cam fulcrum 34. A generally T-shaped bridge member 36 is slidably received on the tongue 32 and underlies a pair of nipple fittings 38,40 secured to the can valve stems 22 and 24, respectively. A cam lever 42 is pivotally engaged with the cam fulcrum 34 on the tongue portion 32 of the carrier 26 and retains the bridge member 36 in the position shown in FIG. 1 on the tongue 32.

The aerosol cans 18 and 20 are conventional and as such are defined at opposite ends by rims 44 and 46, which extend axially of the can body as annular projections. As shown in FIGS. 2, 4 and 5 of the drawings, this conventional characteristic of the aerosol cans 18 and 20 is used to retain the cans 18 and 20 on the carrier 26 in the relative positioning depicted in FIGS. 1 and 2. Specifically, and as shown in FIGS. 2 and 5, the post 28 of the carrier 26 is formed near the tongue end thereof with a platform formation 48. The platform extends from opposite sides of the post 28 and is provided at opposite ends with axially extending wall portions 50. As shown most clearly in FIG. 5, the wall portions 50 are formed with arcuate inner surfaces 52 to complement the inner circumference of the can rims 46.

The cap 30 is spaced from the platform 48 by the length of the cans 18 and 20 and so that the rims 44 at the opposite ends of the cans 18 and 20 from the rims 46 will lie substantially in contact with the cap 30. As shown in FIG. 4, the inner surface of the cap 30, or the surface from which the post 28 projects, is provided with a pair of projecting formations 54 and 56. Each of the formations 54 and 56 is identically configured to define a central diametric rib portion 58 and a pair of crescent-shaped formations 60 joined by a connecting rib 62. The circular periphery defined by the outer surfaces of the crescent-shaped formations 60 and of the diametric rib formation 58 are of a size to fit snugly within the rim 44 of the cans 18 and 20. In light of the described configuration of the carrier 26, each of the cans 18 and 20 may be assembled with the carrier 26 very simply by placing the rim 46 of each can on the platform 48 so that the rim lies inwardly of the wall portion 50 on the platform and then pivoting the cans against the plate 30 until the one of formations 54 or 56 engage in the rim 44 of the can. This assembly procedure is facilitated by molding the carrier 26 from a resilient plastic material such as medium impact styrene.

The nipple fittings 38 and 40 are identical in configuration and, as shown in FIGS. 1 and 2, each includes a rectangular pedestal 64 supporting a cylindrical body 66 adapted to receive the valve stems 22,24 in the upper end thereof. A hose coupling nipple 68 projects perpendicularly from the body 66 and is adapted to receive one of the tubular conduits 14,16 in conventional coupling fashion. Although the interior of the nipple fittings 38 and 40 is not shown, it will be appreciated that an angular passageway is provided in each fitting 38,40 for fluid communication between the valve stems 22,24 and the hose coupling nipple 68.

The T-shaped bridge component 36 is formed in part by a central column portion 70 having a cross-shaped opening 71 extending throughout its length to permit the bridge 36 to be inserted over the cam fulcrum 34 and the tongue 32 on the carrier post 28. Projecting laterally from the column 70 are box-like formations 72 and 74 each having a floor 76 (FIG. 2) and reinforcing side walls 78 which taper from the column formation 70 outwardly as shown. As may be seen in FIG. 2 of the drawings, the floor 76 of each of the laterally extending box-like portions 72 and 74 is provided with a hemispherical bearing 80 in line with the valve stems 22 and 24 and engagable with the bottom surface of the pedestal 64 of the respective nipple fittings 38 and 40. Also, it will be noted that centrally of the bridge member 36 arcuate or semicircular detent projections 82 depend on opposite sides of the bottom portion of the column formation 70.

The cam lever 42 is shown most clearly in FIGS. 2 and 3 of the drawings to include a head portion 84 and a handle portion 86. The head portion 84 includes a segmented cylindrical pivot bearing 88 which opens at the narrow end of an outwardly diverging, tapered mounting slot 90. As may be seen most clearly in FIG. 3, the circumference of the pivot bearing 88 extends through an arc exceeding substantially 180° between its juncture lines with the narrow end of the tapered slot 90. As a result, the cam may be assembled on the fulcrum 34 of the carrier tongue 32 by snap action. In this respect, it is to be noted that the fulcrum 34 is established by a pair of cylindrical stub axles projecting from opposite sides of the tongue 32 with the diameter of the stub axles corresponding to the diameter of the pivot bearing 88 in the cam head 84 to facilitate this assembly. A pair of arcuate caming surfaces 92 and 94 extend on opposite sides of the outer end of the slot 90. The arcuate surfaces 92 and 94 are eccentric with respect to the axis of the pivot bearing 88 so that pivotal movement of the cam lever 42 about the axis of the fulcrum bearing 88 will result in a cam throw as depicted in phantom lines in FIG. 2.

The cam surfaces 94 end at detent recesses 96 and 98 shaped to complement the detents 82 at the base of the bridge member 36. Also the width of the tapered opening 90 at its outer end is dimensioned to receive the detent projections 82 on the bridge member 36. Finally, a medial slot 100 extends through the head 84 of the cam lever 42 to allow pivotal movement of the cam lever in relation to the tongue 32 of the carrier component 26.

In light of the described components, it will be that the aerosol can assembly 10, as shown in FIG. 1, may be easily completed by snapping the cans 18 and 20 into position on the carrier 26 in the manner described above. The nipple fittings 38 and 40 may be either preassembled with the valve stems 22 and 24 of the respective cans or may be assembled after the cans have been mounted on the carrier 26. Thereafter, the bridge member 36 is simply slid or telescoped over the tongue 32 and the cam lever 42 snapped in place on the cam fulcrum 34.

In operation of the device, it is presumed that the metering nozzle 12 is connected to tubing to the outlet nipple 68 of the nipple fittings 38 and 40 and advanced to a closed position by collapsing the tubes 14 and 16 so that no fluid may pass through the nozzle 12. To activate the system, the cam lever 42 is merely pivoted in either direction to advance the bridge member 36 upwardly, as depicted by phantom lines in FIG. 2, to open the can mounted valves from which the valve stems 22 and 24 extend. Thereafter, the contents of the cans 18 and 20 may be discharged by manipulation of the metering nozzle 12.

In FIG. 6 of the drawings, an alternative form of the cam lever 42 is shown in which parts previously identified with respect to FIGS. 2 and 3 are designated by the same reference numerals primed. In this embodiment, the handle portion 86' of the cam lever 42' extends at an angle with respect to the head portion 84' thereof. Also it will be noted that the tapered opening 90' opens laterally from the pivot bearing 88' so that the cam lever 42' is assembled on the pivot fulcrum 34 laterally rather than longitudinally as with the embodiment of FIGS. 2 and 3. A pair of detent recesses 96' and 98' are positioned at opposite ends of a single cam surface 92' so that as the cam lever 42' is moved from the solid line position to the phantom line position in FIG. 6, the throw of the cam is effective to elevate the bridge 36 in the same manner as the cam 42. The advantage of the embodiment in FIG. 6 is that to whatever extent the can valves exert a bias tending to displace the cam lever 42' from its mount on the pivot fulcrum 34, such an accidental displacement of the cam from the fulcrum will be prevented. Also movement of the handle 86' between its open and closed positions is facilitated.

Thus it will be appreciated from the foregoing description and accompanying drawings that an improved can retention and actuating assembly is provided for aerosol foam kits and by which the stated objectives, among others, are completely fulfilled. Also it will be appreciated by those skilled in the art from the preceding description and accompanying drawings that modifications and/or changes may be made in the disclosed embodiments without departure from the invention. Accordingly, it is expressly intended that the foregoing description and accompanying drawings are illustrative of preferred embodiments only, not limiting, and that the true spirit and scope of the present invention will be determined by reference to the appended claims.

In the claims:

1. In a disposable foam dispensing kit for simultaneously discharging separate fluid components of a resin system from a pair of pressurized cylindrical cans each having axially projecting rims at opposite ends and an axially movable valve stem projecting axially from the center of one end, each of said valve stems being operative to release a fluid component upon axial movement inwardly on the axis of said cans, respectively, retaining means for positioning said cans in parallel relationship with the valve stems of each can extending in laterally spaced parallel relationship, means for simultaneously actuating said valve stems to release the fluid components from both cans, discharge nozzle means for mixing the fluid components of the resin system and discharging same as foam, and fluid conduit means extending between said valve stems and said discharge nozzle means, the improvement comprising:

a single carrier component to define said retention means, said carrier component comprising a single central post having spaced rim engaging projections to receive and retain the rims of both cans by snap action, said post extending as a tongue portion between the laterally spaced parallel valve stems of the cans retained by said carrier;

a cam fulcrum at the projecting end of said tongue portion;

bridge means slidably receivable over said cam fulcrum and said tongue portion to engage the ends of the valve stems projecting from both said cans retained by said carrier; and a cam lever connected to said cam fulcrum to advance said bridge means against the ends of said valve stems upon pivotal movement of said cam lever about said cam fulcrum.

2. The foam dispensing kit recited in claim 1 wherein said rim engaging projections comprise a plate formation at one end of said post, said plate formation having projections lying within a circular periphery of a diameter to fit within the rims at the ends of said cans opposite from said valve stems, and a platform formation to engage the rims at the ends of said can from which said valve stems project.

3. The foam dispensing kit of claim 1 wherein said cam fulcrum comprises cylindrical axles projecting from opposite sides of said tongue, said cam lever having a head portion defining a segmented cylindrical pivot bearing to engage said cam fulcrum, at least one cam surface eccentric with respect to the axis of said pivot bearing and a tapered mounting slot converging toward and opening through said pivot bearing to enable snap action assembly of said cam lever with said cam fulcrum.

4. The foam dispensing kit of claim 3 wherein said bridge member includes a detent projecting toward said cam lever, said cam lever having a pair of detent recesses at opposite ends of said cam surface to releasably fix said cam lever in one of two positions.

5. The foam dispensing kit of claim 4 wherein said mounting slot defines the detent recess at one end of said cam surface.

6. The foam dispensing kit of claim 5 wherein said cam lever includes a pair of eccentric cam surfaces, one on each side of said mounting slot.

7. The foam dispensing kit of claim 3 wherein said at least one cam surface of said cam lever head portion includes only a single eccentric cam surface extending between a pair of arcuate detent recesses and wherein said tapered mounting slot opens to a peripheral surface of said mounting head spaced from said cam surface.

* * * * *